United States Patent [19]
Matuka et al.

[11] 3,817,217
[45] June 18, 1974

[54] SANITARY REFUSE RECEIVER AND HARNESS DEVICE (FOR USE ON SMALL ANIMALS)

[76] Inventors: Jozsef Hartmuth Matuka; Margit Matuka, both of 35-55 73rd St., Jackson Heights, N.Y.

[22] Filed: May 21, 1973

[21] Appl. No.: 361,958

[52] U.S. Cl. ............................................. 119/95
[51] Int. Cl. ........................................... A01k 23/00
[58] Field of Search .......... 119/143, 1, 95; 128/295

[56] References Cited
UNITED STATES PATENTS

| | | | |
|---|---|---|---|
| 2,173,356 | 9/1939 | Cross | 119/95 |
| 2,472,186 | 6/1949 | Arnold | 119/95 |
| 2,976,869 | 3/1961 | Silverstone et al. | 128/295 |
| 3,090,356 | 5/1963 | Andrisani | 119/1 X |
| 3,209,517 | 10/1965 | Hyman | 119/143 X |
| 3,211,132 | 10/1965 | Hersh | 119/143 |
| 3,656,459 | 4/1972 | Missud | 119/95 |

*Primary Examiner*—James H. Czerwonky
*Attorney, Agent, or Firm*—Philip D. Amins

[57] ABSTRACT

A sanitary refuse receiver and harness device for use on small animals, such as dogs, is disclosed. The solid waste refuse or excrements of the animal is received and contained therein, and map be disposed of in a sanitary manner. The sanitary waste receiver includes a disposable bag for containing the animal's waste materials and a harness, which is adapted to be removably affixed upon the haunches of an animal. The harness has a waist band and leg bands attached thereto, adapted to completely encircle respective parts of the animal. Extension straps are mounted on the waist and leg bands to facilitate positioning of the disposable bag. The disposable bag cooperates with and is removably affixed to the harness.

9 Claims, 6 Drawing Figures

PATENTED JUN 18 1974 3,817,217
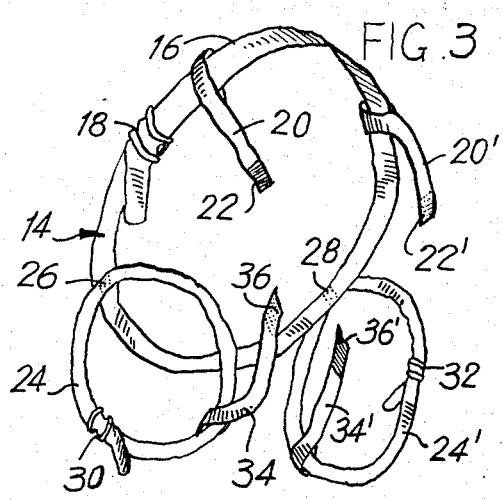
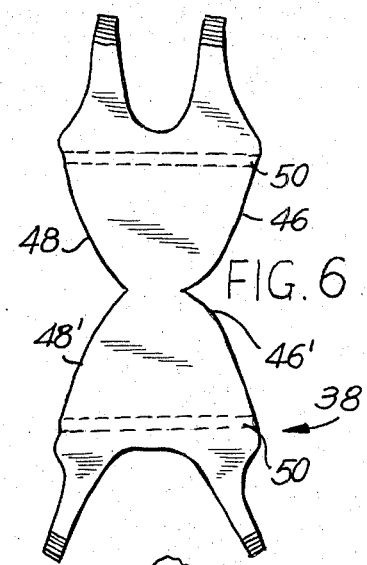
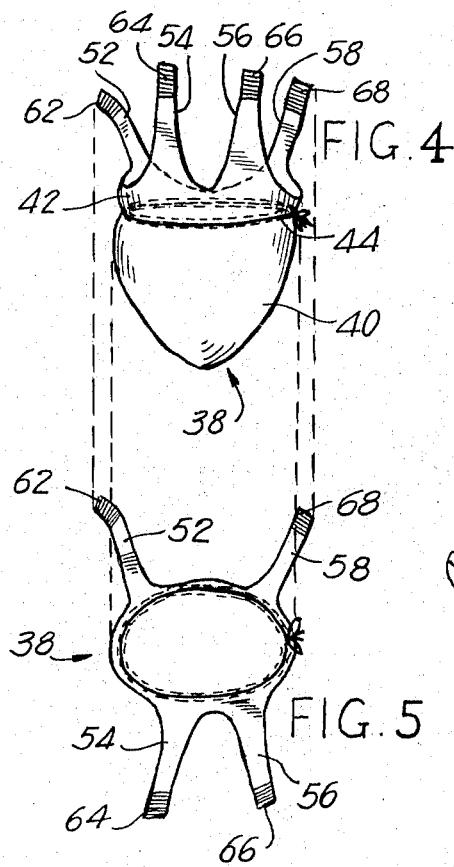
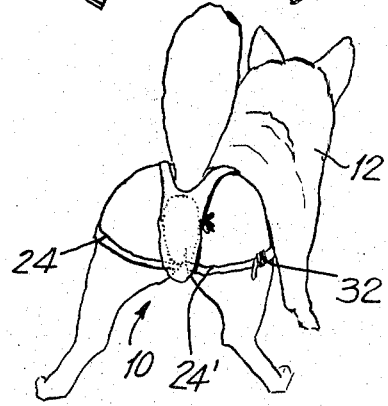
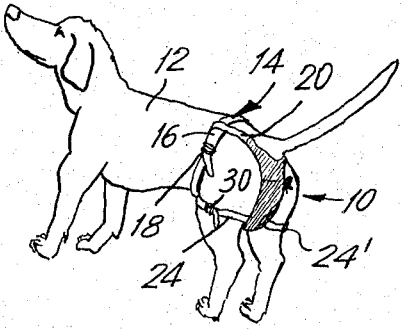

SANITARY REFUSE RECEIVER AND HARNESS DEVICE (FOR USE ON SMALL ANIMALS)

BACKGROUND OF THE INVENTION

This invention relates to sanitary refuse receivers, and in particular, to a sanitary refuse receiver ideally suited for use on small animals.

Many people today own pets such as dogs and cats. These animals are easily trained to relieve themselves at one or two specific times during the course of the day. The owner of the animal is required to walk the pet in the street braving all types of weather, to allow the animal to pass his waste materials to the ground. In additional to adding to the undesirable pollution of the environment the owner of the animal is faced with the unpleasant task of cleaning up the waste by removing it to a garbage can or other suitable container used for this purpose. Occasionally, animals have been trained to relieve themselves indoors in a specific area on newspaper or in a small area outdoors. This reduces the problem to one of clean-up only, since the walking of the animal is eliminated. Leaving the waste material on the ground is undesirable since it contributes to the pollution of the environment as well as being inconvenient for pedestrians who may be frequenting the general area.

SUMMARY OF THE INVENTION

The sanitary refuse receiver and harness device of the present invention effectively eliminates the problems of walking an animal and waste clean-up, by providing a disposable bag which receives and contains the waste materials directly from the animal. By simply closing or tightening the drawstring, the bag retains the waste matter and is readily removed from the harness permitting easy disposal thereof.

It is an object of the present invention to provide a sanitary refuse receiver for use with small animals that is sanitary and provides an easy means for an owner to dispose of the animal's waste matter.

It is a further object of the present invention to provide a sanitary refuse receiver for use with small animals whereby the animal may become accustomed to its use in a relatively short period of time.

It is another object of the present invention to provide a sanitary refuse receiver for use with small animals in which the animal may expel the solid refuse of digestion without polluting the environment.

It is a further object of the present invention to provide a sanitary refuse receiver for use with small animals which is convenient, easy to use, readily disposable and does not require the immediate disposal of the waste material.

A sanitary refuse receiver for use on small animals, according to the principles of the present invention, comprises harness means adapted to be removably retained on the haunches of an animal and bag means adapted to cooperate with said harness means and cover the anus of the animal. The bag means is adapted to contain and retain the solid refuse of digestion.

BRIEF DESCRIPTION OF THE DRAWINGS

In order that the invention may be more fully understood, it will now be described, by way of example with reference to the accompanying drawings wherein:

FIG. 1 is a pictorial representation of a sanitary refuse receiver placed on a small animal such as a dog;

FIG. 2 is the rear view of the animal shown in FIG. 1 with a sanitary refuse receiver affixed thereon, in accordance with the principle of the present invention;

FIG. 3 is an enlarged pictorial representation of the preferred embodiment of the harness used in the present invention;

FIG. 4 is a side view in elevation of a refuse bag used in the preferred embodiment of the invention.

FIG. 5 is a top view of the bag shown in FIG. 4; and

FIG. 6 is a pictorial representation of the bag shown in FIG. 4 prior to being sewn into its final configuration.

DETAILED DESCRIPTION OF THE PREFERRED EMBODIMENT

Referring now to FIGS. 1 and 2, there is shown a sanitary refuse receiver 10 affixed upon the rear haunches of a dog 12. Although the preferred embodiment is depicted affixed to a dog, it is to be understood, that the refuse receiver may be affixed to other small animals equally as well. The preferred embodiment of the sanitary refuse receiver 10 includes a harness 14, which is shown in an enlarged view in FIG. 3. The harness 14 includes a waist-band 16 which is adapted to encircle the waist of the animal 12. An adjustable fastening means 18 is provided on the waist-band 16 to enable the waist-band to be affixed about the waist of the animal. In the preferred embodiment, the adjustable waist-band 16 includes a conventional buckle. The waist-band 16 additionally includes two extending straps 20 and 20'. The extending straps 20 and 20' preferably encircle the waist-band and are sewn in a conventional manner so that they may be slideable on the waist-band 16. The outer extremities 22 and 22' of the extending straps 20 and 20' are provided with an adhesive material. The adhesive material may be of the type known as plastic miniature hooks which are adapted to engage any porous material placed thereon, or a conventionally cooperating looped material.

Additionally included on the harness 14 are two leg bands 24 and 24', which in the preferred embodiment, are sewn on opposing portions 26, 28 of the waist-band 16. The leg bands 24 and 24' are provided with adjustable means 30 and 32, which in the preferred embodiment is a conventional buckle. The buckles allow for the leg bands to be adjusted to a comfortable tightness when placed upon the thigh of an animal to which the sanitary refuse receiver 10 is affixed. Extension straps 34 and 34' may also be included on the leg bands 24 and 24'. The extension straps 34 and 34' encircle the leg bands and are sewn in a conventional manner to provide a loop which allows the extension straps to be moved along the leg bands to a convenient point. The outer extremity of the leg band extension straps 34 and 34' have adhesive portions 36 and 36' which are similar to the adhesive portions 22 and 22' provided on the waist-band extension straps 20 and 20'.

The sanitary refuse receiver 10 further includes a receptacle or bag 38 for containing the solid refuse of digestion of the animal. The bag 38 is shown in FIGS. 4, 5 and 6 and is divided into a lower portion 40 and an upper portion 42. The division is caused by a draw string 44 or ribbon which is affixed to the bag 38 and whose function will be described more fully hereinafter. The extended or flat view of the bag 38, prior to assembly thereof is shown in FIG. 6. In assembling or manufacturing the bag a seam is sewn along the edges 46, 46' and 48, 48', thereby providing a cup or semi-circular spherical container which has been referred to as the lower portion 40 of the bag 38. The draw string 44 is affixed to the bag in a conventional manner, along the dotted area 50, shown in FIG. 6. The upper portion 42 of bag 38 is provided with four finger-like extending portions 52, 54, 56 and 58. At the extremity of the finger-like extending portions 52, 54, 56 and 58, adhesive portions 62, 64, 66 and 68 are provided. The adhesive portions 62, 64, 66 and 68 are respectively adapted to cooperate with the adhesive portions 22, 22', 36 and 36', respectively, provided on the extending straps 20, 20', 34, 34', described previously.

A top view of the bag 38 with the draw string 44 not pulled is shown in FIG. 4.

In operation, the waist-band is affixed around the waist of an animal, e.g., a dog, as hereinbefore described, that is to be provided with the sanitary refuse receiver 10. The buckle 18 is adjusted for a firm fit. The leg bands 24 and 24' are placed on the thighs of the animal and adjusted by means of buckles 30 and 32 until they too are affixed to the thighs of the animal in a manner which does not cause the animal discomfort. The extending straps 20 and 20' of the waist-band 16 are placed on either side of the animal's tail. The receptacle or bag 38 is placed over the anus of the animal with the extending finger portions 54 and 56 extending on either side of the animal's tail and cooperating with and adhering to adhesive portions 22 and 22' of the extending straps 20 and 20'. The other strap finger-like portions 52 and 58 of the bag 38 is pulled down so that the lower portion 40 of the bag covers the anus of the animal and the finger portion made to cooperate with the extending straps 34 and 34' of the leg bands. In using the sanitary refuse receiver for a small animal, it may be convenient to place the finger-like extending portions 52 and 58 in a position to encircle the leg bands 24 and 24' and do away with the extension straps 34 and 34'. In the course of a day, when the animal has excreted the solid refuse of disgestion into the lower portion 40 of the bag 38 all the owner of the animal need do is: pull the drawstring 44, closing the lower portion 40 of the bag 38; remove the bag from the extending straps 20, 20' and 34, 34', and throw it in a garbage receptacle. A bag 38 is then replaced on the harness 14 in the manner described earlier.

We have therefore disclosed an inexpensive sanitary waist receiver which provides sanitary removal of the waste materials of small animals. The sanitary waste receiver of the present invention is easy to use and contributes to the protection of the environment by reducing pollution. It is to be noted that although the present invention has been described in conjunction with use on small animals, it is intended and contemplated that the same is capable of use in conjuction with larger animals, such as horses, cattle and the like.

It will be understood that various changes in the details, materials, arrangements of parts and operating conditions which have been herein described and illustrated in order to explain the nature of the invention may be made by those skilled in the art without departing from the principles and scope of the invention.

What is claimed is:

1. A sanitary refuse receiver for use with an animal comprising: harness means capable of being removably retained on the haunches of said animal and bag means removably mounted on said harness means and capable of covering the anus of said animal, said bag means being capable of containing the solid refuse of digestion, wherein said harness means comprises a waist-band having means to completely encircle the waist of said animal, said waist-band having at least two extension straps mounted thereon and whose free ends extend rearwardly on both sides of the tail of said animal, and two leg-bands attached to said waist-band, each of said leg bands having means to completely encircle the respective thigh of said animal.

2. A sanitary refuse receiver according to claim 1 wherein each of said leg-bands has an extension strap mounted thereon and whose free ends are capable of extending outwardly therefrom.

3. A sanitary refuse receiver according to claim 1 wherein said extension straps are provided with an adhesive portion at each extremity.

4. A sanitary refuse receiver according to claim 2 wherein each of said extension straps is provided with an adhesive portion thereon.

5. A sanitary refuse receiver according to claim 1 wherein said bag means includes a drawstring attached thereto which divides said bag means into a lower portion and an upper portion, said lower portion being capable of retaining said solid refuse when said drawstring is closed, said upper portion being provided with at least four finger-like extending portions capable of cooperating with said waist and leg-bands.

6. A sanitary refuse receiver according to claim 5 wherein said finger-like extending portions of said bag means include an adhesive portion cooperating with said waist and leg bands.

7. A sanitary refuse receiver according to claim 1 wherein said harness means includes a means for adjusting said harness to fit animals of different dimensions.

8. A sanitary refuse receiver according to claim 7 wherein said adjusting means is a buckle.

9. A sanitary refuse receiver according to claim 1 wherein said bag means is made of a nylon material.

* * * * *